United States Patent [19]

Davis et al.

[11] Patent Number: 4,472,778
[45] Date of Patent: Sep. 18, 1984

[54] VEHICLE ANTI-SKID BRAKING SYSTEMS

[75] Inventors: John W. Davis; Geoffrey A. Williams, both of Coventry, England

[73] Assignee: Anti-skid Controls Limited, Coventry, England

[21] Appl. No.: 448,021

[22] Filed: Dec. 8, 1982

[30] Foreign Application Priority Data

Dec. 22, 1981 [GB] United Kingdom ............... 8138661

[51] Int. Cl.³ .............................................. B60T 8/08
[52] U.S. Cl. ...................................... 364/426; 303/92; 303/95
[58] Field of Search ................. 364/426; 303/921, 95, 303/105

[56] References Cited

U.S. PATENT DOCUMENTS 3,818,433 6/1974 Okamoto et al. ..................... 303/92
3,861,755 1/1975 Taylor ................................... 303/92

FOREIGN PATENT DOCUMENTS 1515008 6/1978 United Kingdom .

Primary Examiner—J. V. Truhe
Assistant Examiner—Saul M. Bergmann
Attorney, Agent, or Firm—Stevens, Davis, Miller & Mosher

[57] ABSTRACT

A vehicle anti-skid braking system, particularly for articulated vehicles, in which a fail-safe device is incorporated to disable the braking-releasing function if a skid signal is generated during the initial period of operation of the braking system before the brakes have been effectively applied.

7 Claims, 6 Drawing Figures

VEHICLE ANTI-SKID BRAKING SYSTEMS

This invention relates to vehicle anti-skid brake-operating systems, and particularly but not exclusively to systems for an articulated vehicle incorporating a tractor and trailer wherein anti-skid operation of the trailer brakes is required.

A known system for anti-skid control of the brakes on a trailer comprises an electrically-powered skid-sensing unit and electronic control unit of conventional type, mounted on the trailer and arranged to effect automatic release of the trailer brakes when an incipient skid is sensed and to reapply the brakes when the tendency to skid has been checked.

Should a fault develop, for example in the electronic control unit itself, the effect of which is to place the system permanently in the "brake-released" condition, the brakes of the trailer cannot be applied. It is therefore highly desirable to provide means for monitoring the trailer anit-skid system and automatically to inhibit its brake-releasing function whenever such a fault develops.

Continuous montitoring of an electrical anti-skid system on a trailer presents a problem, since the standard electrical couplings used to connect the trailer to the electrical circuits and electrical power source on the tractor do not permit the anti-skid system to be permanently supplied with electrical power. A coupling system in common use powers the anti-skid system from a connection to the stop light circuit of the trailer, this being chosen on the ground that the anti-skid system is only required when the brake is operated. But a problem then arises in providing a monitoring system since this can only be supplied with electrical power when the brakes are actually being operated, and this appears to conflict with the obvious requirement that the anti-skid system should be checked, and if necessary disabled, before the need for the brakes to be operative arises.

According to the present invention a vehicle anti-skid brake-operating system comprises means to effect application of a brake or brakes, a wheel speed sensing device, and skid control means arranged to be controlled by the wheel speed sensing device so as to be placed in a brake-releasing state when excessive wheel speed deceleration takes place, wherein the system comprises monitoring means arranged, during any period beginning with actuation of the brake-operating system and ending before sufficient brake-operating pressure has been supplied to cause excessive wheel deceleration to take place, to respond to any indication within the system during the said period that excessive wheel speed deceleration is present so as to disable the brake-releasing function of the system.

A typical period during which monitoring means may operate has been found to be of the order of 200 milliseconds following the connection of a power supply to the electronic control unit through the stop light circuit, consequent upon actuation of the vehicle brakes. This period is normally insufficient to permit any significant braking action to have developed in the usual air-operated trailer brake system, since there is an inherent lag in the operation of the air braking system and the taking-up of clearances in the brakes themselves also occupies a finite time. Thus it may safely be assumed that if the electonic control unit is found to be in the "brake-release" state during this period there must be a malfunction.

Embodiments of the invention will now be described with reference to the accompanying drawings, in which.

Figure 1:
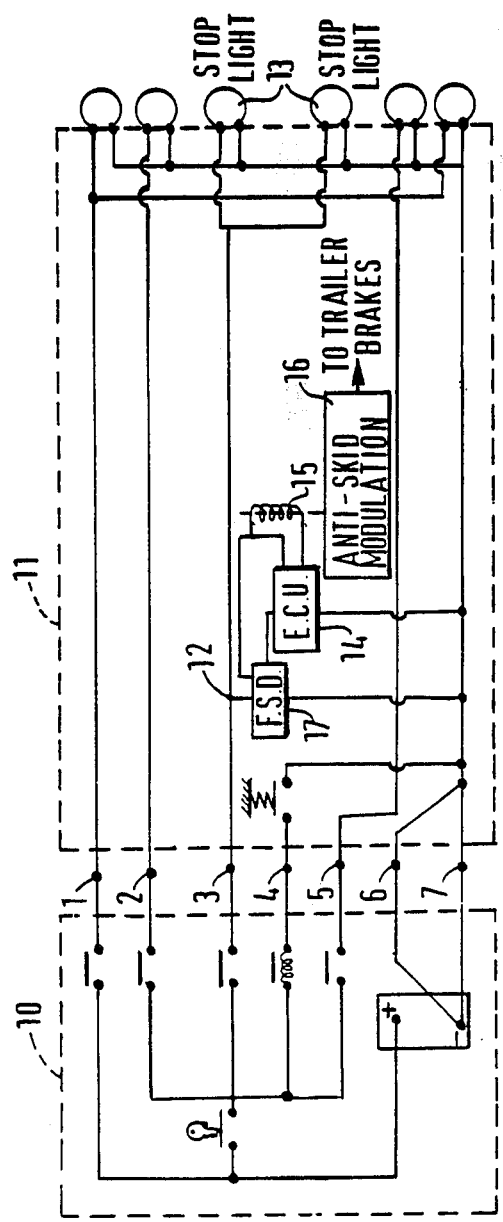
FIG. 1 is a circuit diagram showing one arrangement for the incorporation of the invention in a tractor-trailor electrical system.
Figure 2:
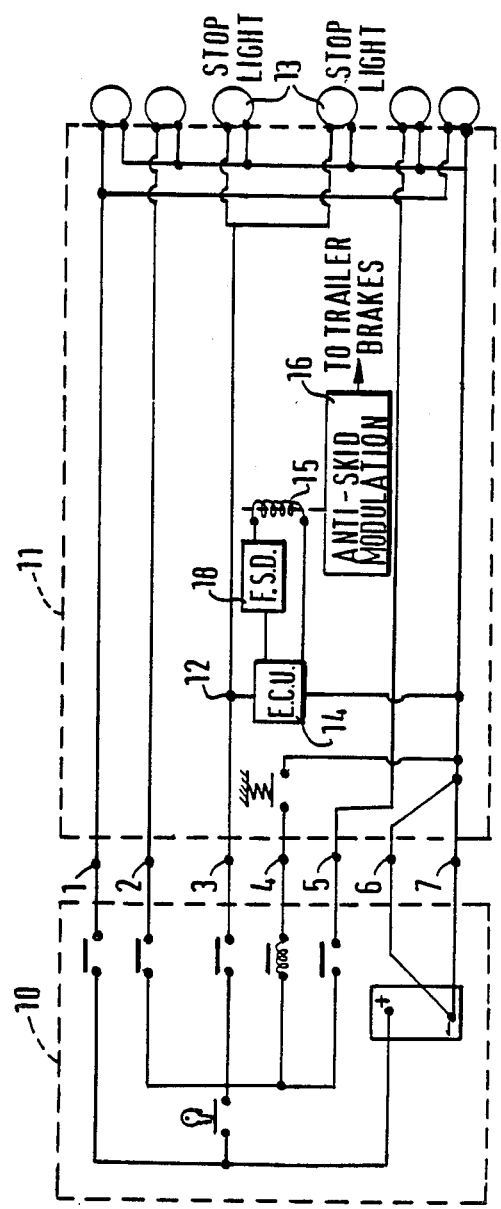
FIG. 2 is a circuit diagram similar to that of FIG. 1, but showing an alternative arrangement.

In FIGS. 1 and 2 the interconnection of the electrical systems of the air-braked tractor and trailer is indicated by connections 1–7 which are made by a flexible lead and a conventional 7-pin-plug and socket, the electrical system of the tractor being indicated by the dotted-line block 10 and that of the trailer by the dotted-line block 11.

It will be seen that all of the seven pins available for electrical interconnection between the tractor and trailer system are taken up. The connections 1, 2, 3, 4 and 5 are positive supplies to circuits on the trailer which are essential to its operation, and 6 and 7 are common negative earth return connections. All of these connections are standard, since there is an operational requirement in the haulage industry for tractors and trailers to be compatible and interchangeable.

Only the stop-light connection 3 is of interest from the point of view of the present invention, for it is the only positive supply which must be operative when brakes are applied. The remaining connections are entirely conventional and do not require description.

As shown in FIG. 1, an anti-skid system for the trailer brakes is provided with electrical power through a connection 12 to the supply for the trailer stop-light 13 (which is taken from the connection 3 on the 7-pin connector). The anti-skid system comprises skid control means including an electronic control unit (E.C.U.), 14, which is actuated by a wheel speed sensing device (not shown) and is arranged to operate a solenoid 15 whenever the electronic control unit detects a tendency for the trailer wheels to skid. The solenoid 15 in turn operates an anti-skid modulating device 16 associated with the trailer brake operating mechanism (not shown) so as to release the brakes until the incipient skid has been averted. The electronic control unit, solenoid and modulation device are of conventional form and do not need to be described in detail.

In FIG. 1, monitoring means in the form of a fail-safe device 17, which will be described later in more detail, is inserted between the power connection 12 and the electronic control unit 14. Its function is to operate during a short period, say 200 milliseconds, following the application of the brakes and consequent supply of power to the stop-light circuit of the trailer through the connection 3, to detect whether the electronic control unit 14 is in the "brake-release" state. If during this period the "brake-release" state of the unit 14 is detected the fail-safe device 17 operates to cut off the power supply to the unit 14 and thus to inactivate the anti-skid system, ensuring that operation of the braking system is not prevented by any fault which may have caused the unit 14 to enter a "brake-release" state.

FIG. 2 shows a system which is essentially similar to that of FIG. 1, except that the electronic control unit is permanently connected to the power connection 12 and the fail-safe device 18 is arranged so that it can sever the connection between the unit 14 and the solenoid 15 whenever a spurious "brake-release" state of the unit 14 arises, as described above.

Whilst in FIGS. 1 and 2 the fail-safe device is shown as a separate device from the electronic control unit, in a practical circuit it may be physically integrated with the electronic control unit.

The use of fail-safe devices as described above is primarily intended for air braked trailers because these are most common in commercial vehicle combinations and currently make wide use of anti-skid braking systems. The principles involved can be applied to trailers with other braking systems, e.g. hydraulic brakes controlled by air, vacuum or electrical means, or overrun mechanisms. It is of course necessary to establish appropriate time periods, for the various braking systems, during which operation of the electronic control unit to release the brakes can only arise from a fault in the system.

Figure 3:
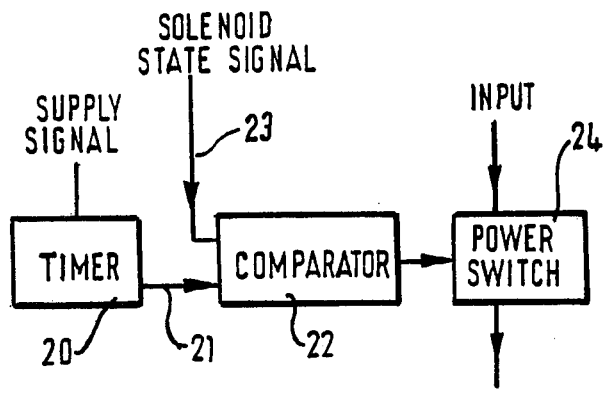
FIG. 3 is a block schematic diagram showing the essential elements of the fail-safe device for use in the systems of FIG. 1 or FIG. 2.

FIG. 3 illustrates the basic operation of the fail-safe circuit, which detects if the solenoid is in the "brake pressure reducing condition" during the initial short period of electrical supply application. When the driver's foot pedal is depressed, an electrical supply is applied to a timer 20 the output 21 of which is fed into a comparator 22. The comparator 22 also has a "solenoid state" signal 23 as an input. If during the initial 200 milliseconds (approximately), of brake application the solenoid is found to be in, or goes to, the "brake-pressure reducing condition" a fault is deemed to have occurred and a power switch 24 is turned off. The switch 24 may be arranged appropriately in the circuit of FIG. 1 or FIG. 2 to ensure that the brake-releasing operation of the modulation device 16 is prevented when a fault arises. Thus the power supply to the electronic control unit, or the solenoid, is turned off, and the system reverts to the "brakes applying" condition. This series of events will take place each time the brakes are applied for as long as the failure condition persists.

Figure 4:
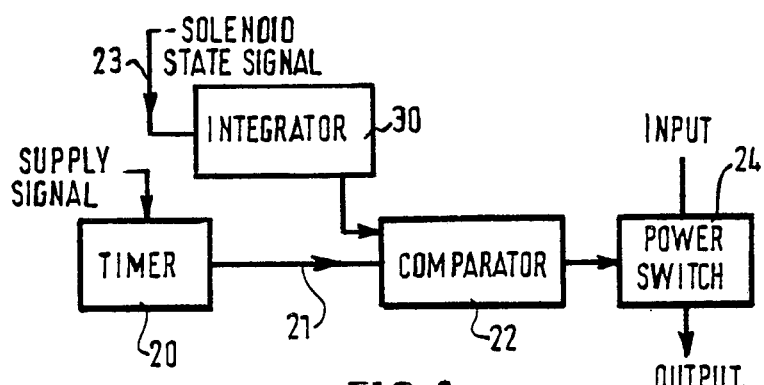
FIGS. 4–6 are block schematic diagrams showing refinements to the basic fail-safe device of FIG. 3.
Figure 5:
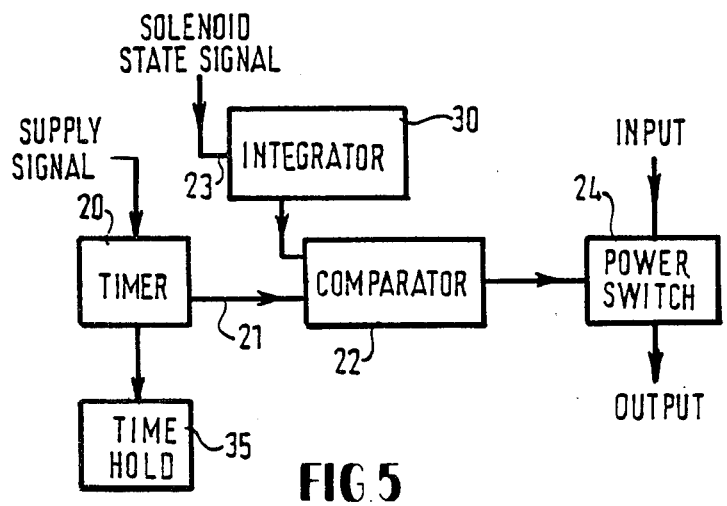
Figure 6:
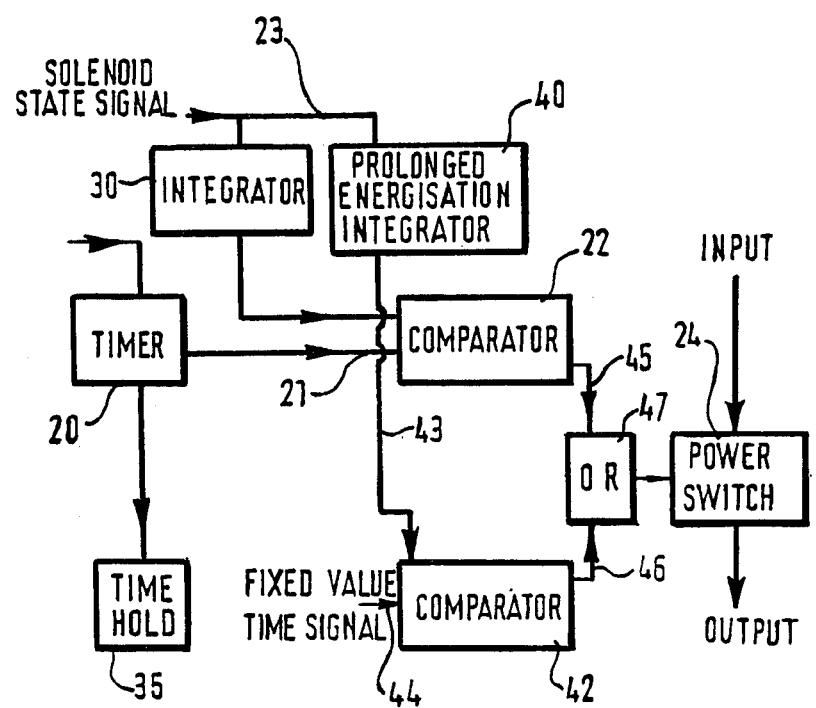

In practical applications certain refinements to the basic system may be required, as shown in FIGS. 4 to 6.

In FIG. 4 an integrator 30 has been added to ensure that stray noise pulses within the first 200 milliseconds do not inadvertently turn off the anti-skid system. The integrator operates over the first 200 milliseconds, and the time constants of the integrator are chosen to be greater than the effective operating time constants of the solenoid valve. The arrangement is such that if the integrator charge rises to a higher level than that which would cause solenoid operation, within the first 200 milliseconds, the system will revert to the "brakes applying" condition, but if a "spike" or series of "spikes" appears in the "solenoid state" signal 23 as a result of stray noise in the system, these will not persist for a long enough time to operate the fail-safe device.

In FIG. 5, an additional component is added, a "time-hold" circuit 35. The "time-hold" circuit 35 ensures that when the brakes are released (i.e. supply signal goes to zero), sufficient time (about 1 second) is allowed for the air pressure in the trailer brake actuators to discharge before the timer is permitted to operate and set a further 200 milliseconds second period during which a "skid" signal may be taken to be spurious. The need for this "time-hold" circuit arises because wnen the driver re-applies the brake very quickly after releasing it, some air pressure may remain in the actuator and hence reduce the time required to reach wheel locking conditions so that a "brake-release" signal in the first 200 milliseconds may correspond to a genuine "skid" signal. The "time-hold" circuit thus disables the fail-safe device for a short period following each brake release, but this is a negligible proportion of the vehicle's operating time.

In FIG. 6, a "prolonged energisation integrator" (P.E.I.) circuit 40 is provided to monitor the solenoid for energisation signals persisting longer than the maximum time (2–4 seconds) likely during normal anti-skid operation. If this occurs, a comparator 42 compares a signal 43 from the circuit 40 with a fixed value "time" signal 44 and operates to disable the solenoid when the signal 23 persists longer than the predetermined period. Comparator 22 of this circuit is associated with the initial application monitoring circuit as described above, and the outputs 45 and 46 from the comparators 22 and 42 are fed into an 'OR' gate 47 which therefore operates the power switch when either premature or over-prolonged solenoid energisation signals appear.

The system described above has the advantage in commercial articulated vehicle operation, that it requires only the conventional 7-pin coupling between tractor and trailer. This is a very important practical requirement which hitherto had made it impossible to incorporate a fail-safe device in a trailer anti-skid system.

A further modification to the system described above would be to incorporate means for displaying to the driver a signal that failure of the anti-skid system had been detected. Without incorporating additional signal lines, which for the reasons mentioned above are highly undesirable, such a signal could be provided by means of a warning light mounted on the trailer in a position where it can be seen by the driver when he applies his brakes.

Having now described our invention—What we claim is:

1. A trailer brake anti-skid operating system for an articulated vehicle incorporating a tractor and a trailer coupled thereto, said system comprising means to effect application of at least one brake, a wheel speed sensing device, skid control means arranged to be controlled by the wheel speed sensing device so as to be placed in a brake-releasing state when excessive wheel speed deceleration takes place, and monitoring means affording an indication during any period beginning with actuation of the brake-operating pressure has been supplied to cause excessive wheel deceleration to take place, that excessive wheel speed deceleration is present so as to disable the brake-releasing function of the system, wherein the skid control means and monitoring means are electrically operated and arranged to be supplied with electrical power from a brake warning light system on the trailer which receives power only when the brake is actuated by the driver of the tractor to which the trailer is coupled.

2. A trailer brake anti-skid operating system according to claim 1, wherein the monitoring means comprises a fail-safe device arranged in response to a spurious skid signal to cut off power from an actuating solenoid of an anti-skid modulation device associated with the trailer brake operating mechanism.

3. A trailer brake anti-skid operating system according to claim 1, wherein the monitoring means comprises a fail-safe device arranged in response to a spurious skid signal to cut off power from the skid control means.

4. A trailer brake anti-skid operating system according to claim 1, wherein the monitoring means comprises a fail-safe device incorporating a timer the action of which is initiated by the brake warning light system and a comparator arranged to receive at one input a signal from the timer during a predetermined period after actuation of the braking system and at another input a skid signal indicating operation of the skid control means, the output from the comparator being arranged to disable the skid control means whenever a skid signal arises during the predetermined period.

5. A trailer brake anti-skid operating system according to claim 4, wherein an integrator circuit is provided in the comparator input associated with the skid signal to ensure that the fail-safe device only operates if the skid signal persists sufficiently to provide a predetermined integrated output level.

6. A trailer brake anti-skid operating system according to claim 4 wherein a time hold circuit is arranged to disable the fail-safe device for a predetermined period following each initiation of release of the trailer brake operating system.

7. A trailer brake anti-skid operating system according to claim 4 wherein a prolonged energization integrator is arranged to effect operation of the fail-safe device to disable the skid control means whenever a skid signal persists for a greater period than a predetermined period.

* * * * *

UNITED STATES PATENT AND TRADEMARK OFFICE
CERTIFICATE OF CORRECTION

PATENT NO. : 4,472,778
DATED : September 18, 1984
INVENTOR(S) : John W. DAVIS, et al It is certified that error appears in the above—identified patent and that said Letters Patent is hereby corrected as shown below:

Column 1, line 21, "anit" should read -- anti --.

Column 2, line 7, "trailor" should read -- trailer --.

Column 2, line 17 "the" should read -- an --.

Column 2, line 19 "7-pin-plug" should read -- 7-pin plug --.

Column 3, line 66, "milliseconds second" should read -- millisecond --.

Column 4, line 23 after "advantage" insert -- , --.

Column 4, line 50 after "operating" the following should be inserted -- system and ending before sufficient brake-operating --.

Signed and Sealed this

Eleventh Day of March 1986

[SEAL]

Attest:

DONALD J. QUIGG

Attesting Officer

Commissioner of Patents and Trademarks